July 26, 1960  F. L. EATON  2,946,563
TENSION RETAINING BINDER
Filed Oct. 14, 1955
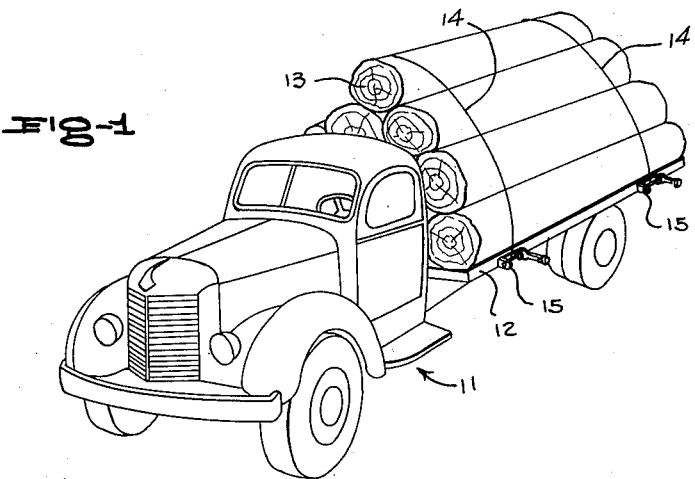
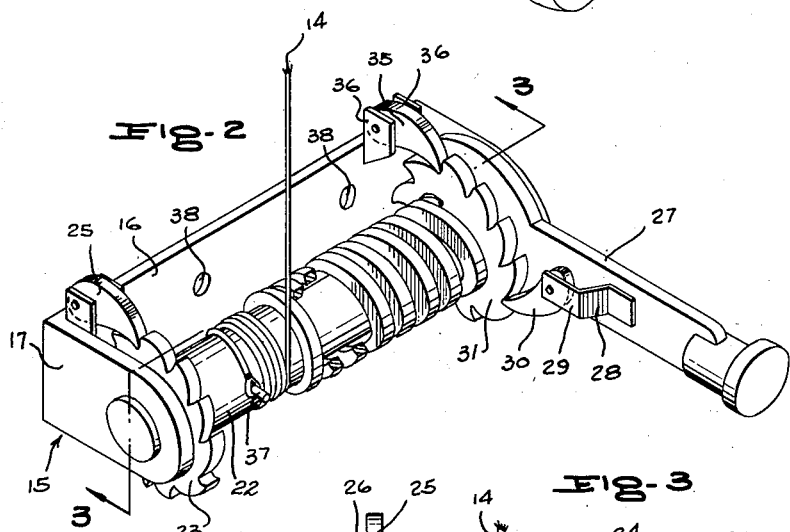
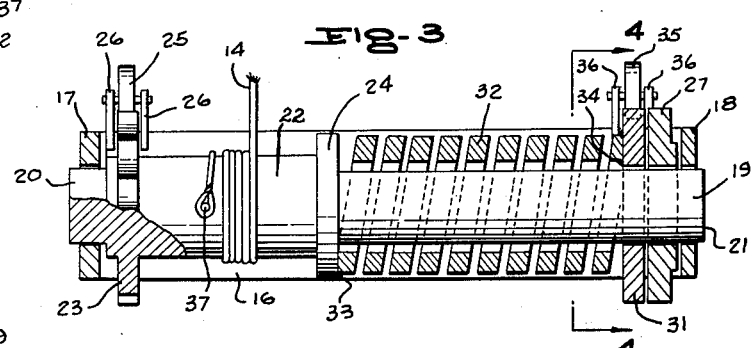
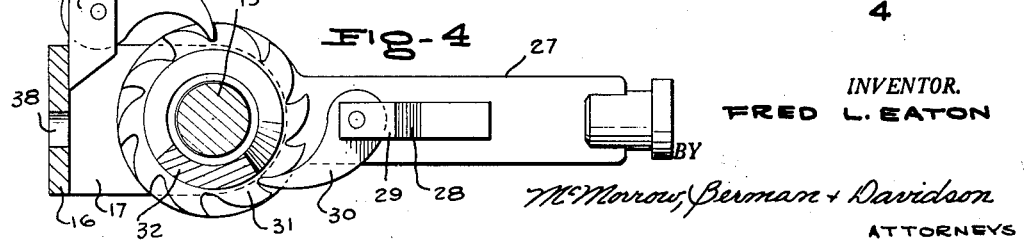
INVENTOR.
FRED L. EATON
BY McMorrow, Berman + Davidson
ATTORNEYS

United States Patent Office 2,946,563
Patented July 26, 1960

2,946,563

TENSION RETAINING BINDER

Fred L. Eaton, Decoto, Calif.; Lawrence Edward Eaton, administrator of said Fred L. Eaton, deceased Filed Oct. 14, 1955, Ser. No. 540,438

2 Claims. (Cl. 254—164)

This invention relates to load binding devices, and more particularly to an improved tension device for maintaining a high degree of tension in a load binding cable on a truck or similar vehicle.

A main object of the invention is to provide a novel and improved load tensioning device which is simple in construction, which is easy to install, and which may be employed in any suitable location, for example, on the side of a truck bed for tensioning a cable disposed over a load mounted on the bed.

A further object of the invention is to provide an improved load tensioning binder which is inexpensive to manufacture, which is durable in construction, which is relatively compact in size, and which maintains a desired degree of tension in a load retaining cable on a truck or similar vehicle on which the device is installed.

Further objects and advantages of the invention will become apparent from the following description and claims, and from the accompanying drawings, wherein:

Figure 1 is a perspective view of a truck provided with load binding tension devices according to the present invention.

Figure 2 is a perspective view of one of the tensioning devices of the present invention employed in Figure 1.

Figure 3 is a longitudinal vertical cross section view taken on line 3—3 of Figure 2.

Figure 4 is a transverse vertical cross sectional view taken on line 4—4 of Figure 3.

Referring to the drawings, 11 generally designates a truck having a bed 12 on which objects, such as logs, pipe or the like may be held, for example, the logs 13 shown in Figure 1. The logs 13 are retained on the bed 12 by means of a pair of cables 14, 14 extending transversely over the logs and secured at one side of the bed by any suitable means, and fastened at the other side of the bed to respective tension devices 15, 15 secured to said other side of the bed.

Each of the tension devices 15 comprises a longitudinally extending supporting bracket 16 formed at its ends with the outwardly extending lugs 17 and 18 having apertures rotatably receiving the respective opposite end portions 19 and 20 of a shaft 21. The shaft 21 comprises a reel portion 22 defined between a ratchet wheel 23 located adjacent the lug 17 and an annular flange 24 located at the intermediate portion of the shaft, as shown in Figure 3. The ratchet wheel 23 is engaged by a pawl 25 pivoted between a pair of lugs 26, 26 secured to and projecting upwardly from the longitudinal main portion of the bracket member 16 adjacent the lug 17. As shown in Figure 2, the pawl 25 engages the toothed periphery of the ratchet wheel 23 and prevents the shaft 19 from rotating counterclockwise, as viewed in Figure 2.

Rotatably mounted on the shaft portion 19 adjacent the lug 18 is a lever 27 on which is secured a Z-shaped bracket 28 having an arm 29 extending parallel to the lever 27 toward the shaft 19. Pivoted between the arm 29 and lever 27 is a pawl 30 which engages the toothed periphery of a ratchet wheel 31 rotatably mounted on shaft portion 19 inwardly adjacent the lever 27. Designated at 32 is a coil spring which surrounds the reduced portion of shaft 21, one end of the spring being secured to flange 24 at 33 and the other end of the spring being secured to ratchet wheel 31 at 34.

Designated at 35 is a pawl pivotally mounted between a pair of upstanding lugs 36, 36 secured to the upper portion and projecting upwardly from the longitudinal main body portion of bracket member 16 adjacent to the lug 18, as shown in Figure 3, whereby the pawl 35 engages the upper portion of the toothed periphery of the ratchet wheel 31, the pawl 35 being cooperable with the ratchet wheel to prevent counterclockwise rotation of said ratchet wheel, as viewed in Figure 2.

As shown, both ratchet wheel 23 and ratchet wheel 31 have their teeth directed in such a manner that the ratchet wheels may be rotated clockwise but are prevented from rotating counterclockwise by the engagement of their pawls 25 and 35 therewith.

As will be further apparent from Figure 2, ratchet wheel 31 may be rotated clockwise by means of the lever 27, since the pawl 30 engages the teeth of the ratchet wheel 31 in a manner such that clockwise torque exerted on the lever 27 will be transmitted to the ratchet wheel 31.

Secured on and projecting from the reel portion 22 of shaft 21 is an anchoring pin 37 to which one end of the load binding cable 14 is secured.

As will be apparent from Figure 2, when the lever 27 is rotated clockwise, this causes the ratchet wheel 31 to be rotated clockwise, whereby torque is transmitted from the ratchet wheel 31 through the coil spring 32 and the flange 24 to the shaft 21, causing the cable 14 to be wound up on the reel portion 22 of the shaft. Since the ratchet wheel 31 is resiliently connected to the shaft 21 through the coil spring 32, a substantial amount of spring tension may be developed in the spring 32 which acts on the shaft and on the cable 14 to retain the cable 14 in a taut condition after said cable has been tightened against the load of objects, such as the logs 13, on the truck.

The bracket members 16 are provided with suitable apertures 38, 38, whereby the bracket members may be fastened to the side of the truck bed 12 by means of suitable bolts, or other suitable fastening means, in the manner illustrated in Figure 1.

The shaft 21 is held against reverse rotation by the engagement of the pawl 25 with the ratchet wheel 23. Similarly, the ratchet wheel 31 is held against reverse rotation by the engagement of the pawl 35 with the toothed perpihery of said ratchet wheel 31. To release the cable 14 it is merely necessary to disengage the pawls from the respective ratchet wheels to allow the shaft 21 to rotate freely so as to allow cable 14 to unwind therefrom.

While a specific embodiment of an improved tensioning device has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a load vehicle, a side portion, a supporting bracket secured longitudinally to said side portion, a shaft journaled longitudinally in said bracket, a lever rotatably mounted on said shaft, cooperating ratchet means on one end of said shaft and on the adjacent portion of the bracket limiting rotation of said shaft relative to said bracket, a ratchet wheel rotatably mounted on the other end of said shaft, pawl means on said bracket engaging said ratchet wheel and limiting rotation of said ratchet wheel relative to said shaft, means drivingly coupling said shaft to said ratchet wheel comprising; a coil spring surrounding said shaft between said ratchet means and said ratchet wheel, one end of said spring being connected to said shaft and the other end of said spring being connected to said ratchet wheel, said spring being constructed and arranged to transmit torque from said ratchet wheel to said shaft, and a load binding cable anchored to said shaft, whereby a desired amount of spring tension may be placed on said load binding cable when said cable is wound on said shaft.

2. In a load vehicle, a side portion, a supporting bracket secured longitudinally to said side portion, a shaft journaled longitudinally in said bracket, a lever rotatably mounted on said shaft, a first ratchet wheel secured rigidly on one end of said shaft, a pawl pivoted to said bracket member adjacent to and engaging said ratchet wheel, limiting rotation of said shaft relative to said bracket, a second ratchet wheel rotatably mounted on the other end of said shaft, a second pawl pivoted to said bracket and engaging the second ratchet wheel, limiting rotation of said second ratchet relative to said bracket, a third pawl pivoted to said lever and drivingly engaging said second ratchet wheel, coupling said lever to said second ratchet wheel, a coil spring surrounding said shaft, one end of said spring being connected to said shaft and the other end of said spring being connected to said second ratchet wheel, said spring being constructed and arranged to transmit torque from said second ratchet wheel to said shaft, and a load binding cable anchored to said shaft, whereby a desired amount of spring tension may be placed on said load binding cable when said cable is wound on said shaft.

References Cited in the file of this patent
UNITED STATES PATENTS

| | | |
|---|---|---|
| 363,314 | Butts | May 17, 1887 |
| 663,757 | Hertel | Dec. 11, 1900 |
| 1,056,120 | Poindexter | Mar. 18, 1913 |
| 1,213,698 | Sharp et al. | Jan. 23, 1917 |
| 1,504,749 | Eckart | Aug. 12, 1924 |
| 2,160,734 | Henriksen | May 30, 1939 |
| 2,165,603 | Yeats | July 11, 1939 |
| 2,514,394 | Irving | July 11, 1950 |